United States Patent [19]

McClure

[11] Patent Number: 5,186,330
[45] Date of Patent: Feb. 16, 1993

[54] STACKABLE CONTAINER

[75] Inventor: Delmar H. McClure, Molalla, Oreg.

[73] Assignee: McClure Industries, Inc., Portland, Oreg.

[21] Appl. No.: 815,119

[22] Filed: Dec. 27, 1991

[51] Int. Cl.$^5$ ............................................. B65D 21/02
[52] U.S. Cl. ................................... 206/508; 206/511; 220/1.5; 220/908
[58] Field of Search ............... 206/503, 508, 509, 511; 220/908, 1.5, 4.27

[56] References Cited

U.S. PATENT DOCUMENTS

| 621,601 | 3/1899 | Conley . | |
|---|---|---|---|
| 2,761,582 | 9/1956 | Moore | 206/508 X |
| 3,113,690 | 12/1963 | Swenck . | |
| 3,616,943 | 11/1971 | Brink . | |
| 3,643,993 | 2/1972 | Asadurian . | |
| 3,823,973 | 7/1974 | Ramer . | |
| 3,828,964 | 8/1974 | Bonnot | 220/1.5 |
| 3,977,558 | 8/1976 | Nilsson | 220/1.5 |
| 4,000,704 | 1/1977 | Griffin, Jr. | 206/511 X |
| 4,042,111 | 8/1977 | Smith | 206/508 |
| 4,416,374 | 11/1983 | Smith et al. . | |
| 4,678,084 | 7/1987 | Maker et al. | 206/597 |
| 4,887,731 | 12/1989 | Pett et al. | 220/1.5 |
| 5,011,036 | 4/1991 | Souza et al. . | |
| 5,022,546 | 6/1991 | Bock . | |
| 5,105,967 | 4/1992 | Horpestad | 220/333 |

OTHER PUBLICATIONS

"Does This Scare You? It Should!", product comparison published by McClure Industries, Inc.

Primary Examiner—Allan N. Shoap
Assistant Examiner—Stephen Cronin
Attorney, Agent, or Firm—Kolisch Hartwell Dickinson McCormack & Heuser

[57] ABSTRACT

A mobile infectious waste container including a lid which is sealable to a container body. The container includes a target region projecting outwardly from the lid and an alignment region extending oppositely from the container's floor. Upon vertically adjacent positioning of a similar container, without offset, the alignment region and target regions cooperatively interfit to oppose relative transverse movement of the containers. The container includes a bumper which extends at least partially perimetrically thereabout. The bumper includes a substantially uniformly inclined contact surface and is dimensioned such that the bumper's height is at least twice the bumper's thickness.

9 Claims, 2 Drawing Sheets

STACKABLE CONTAINER

BACKGROUND OF THE INVENTION

The present invention relates generally to containers, and more particularly to containers which are adapted for stacking in vertically aligned adjacency.

The container herein proposed is useful in the collection, storage and transport of a variety of bulk materials, but is particularly suited for use in handling materials which exhibit potentially dangerous or offensive properties. Specifically, the present invention is adapted for use in handling infectious medical waste. Such waste, when not properly isolated from the public may lead to a health hazard. The odor or appearance of medical waste may also be offensive if not properly contained. When handling such a material, containers may serve to isolate the material from the public, curtailing problems associated with its potentially dangerous or offensive properties.

Containers also serve to maximize the use of available space during transport or storage of bulk materials, keeping such materials in an orderly arrangement. Toward this end, containers have been developed which are stackable, one on top of the other. Such stackability has generally been achieved by simply providing the containers with substantially flat top and bottom surfaces, the containers thus being stackable by placing the bottom of one container on the top of another.

One problem with containers of the foregoing type, however, concerns the difficulties associated with aligning the containers upon vertical stacking of the same. Vertical alignment of the containers is often left to the eye of an individual and is therefore rarely precise. An upper container may, for example, be placed atop a lower container in an offset position, leaving a portion of the upper container hanging over the edge of the lower container. This offset may, in turn, result in an unstable stack, and consequently in the spilling or dumping of the containers.

Use of known stackable containers may also result in an unstable container stack due to the limited opposition to relative transverse motion of such containers when in stacked arrangement. Prior art containers have addressed this problem by providing latch mechanism by which containers may be secured to one another. Such an arrangement, however, requires an additional step when stacking or unstacking containers and is therefore undesirable.

The problems associated with stacking containers are compounded where the containers to be stacked are wheeled. Such containers not only present a problem relating to the compatibility of adjacent surfaces, but also with respect to the opposition to relative transverse motion.

Known wheeled containers, when stacked, would simply roll off the container therebelow. Another problem with prior art stackable containers relates to the ability of such containers to support the weight of the containers stacked thereon. In order to support above-stacked containers, prior art containers have commonly been constructed of sturdy materials such as steel. Alternatively, containers have been formed with lids which are thick enough to support the above-stacked containers. Prior art containers have thus been relatively heavy, adding to the cost and the difficulty in handling the containers.

It is therefore desired to provide an improved container adapted for stacking in aligned vertical adjacency with similar containers.

SUMMARY OF THE INVENTION

The invented container includes a first exterior surface portion having a target region projecting outwardly therefrom and a second exterior surface portion having an alignment region. The alignment region is formed such that, upon vertically adjacent positioning of a similar container, without offset, the alignment region and target regions cooperatively interfit to oppose relative transverse movement of the containers.

DETAILED DESCRIPTION OF THE INVENTION

Figure 1:
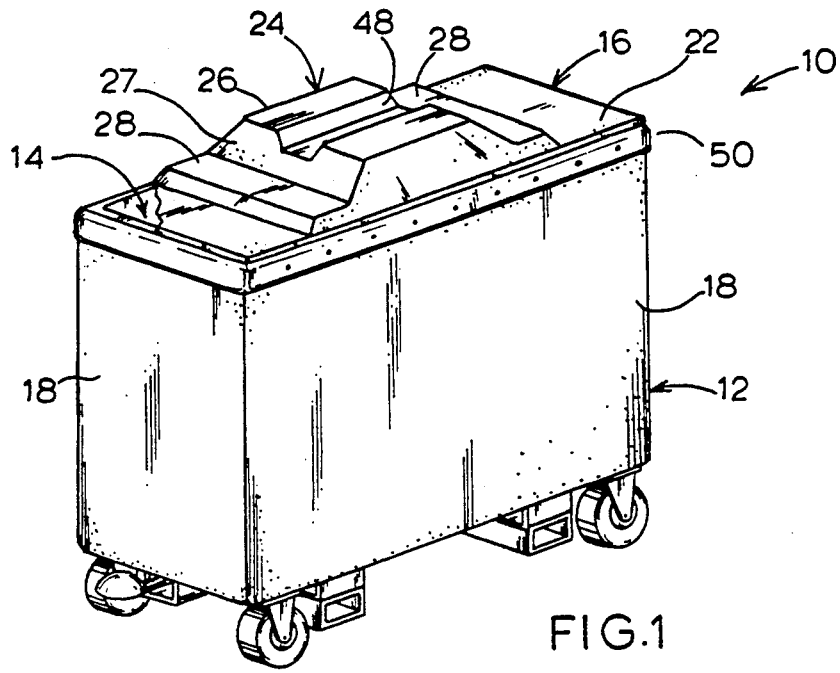
FIG. 1 is an isometric view of a preferred embodiment of the invented container as viewed from an upper left position.

As stated above, the present invention relates to containers which are adapted for plural arrangement in vertically aligned stacks. The containers are suitable for use in the collection, storage and transportation of a variety of materials, including bulk materials such as infectious waste. A preferred embodiment of the invented container has been depicted in the drawings, the device being indicated generally at 10.

Figure 2:
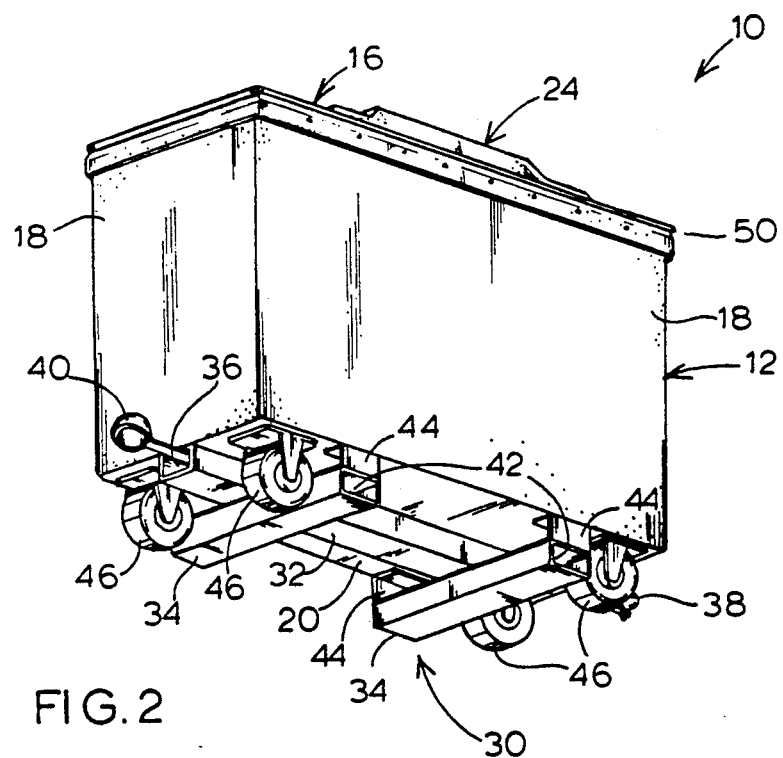
FIG. 2 is an isometric view of the container embodiment depicted in FIG. 1, the container being viewed from a lower left position.

Referring initially to FIGS. 1 and 2, it will be noted that container 10 includes a container body 12 having walls 18 and a floor 20. The walls and floor together define a cavity 14, such cavity being suitable for holding various bulk materials therein. Where a fluid-containing material such as infectious waste is to be held by the container, the floor may include a drain means (not shown), such drain means being adapted for selective release of fluid materials from the container's cavity. It should be evident that, although the depicted container body is generally right-parallelepiped-shaped, the body may be of any shape suitable for holding the to-be-handled material.

Upon inspection of FIG. it will be noted that container 10 also includes a lid 16, such lid being adapted for operative association with body 12. In the preferred embodiment of the invention, lid 16 is associated with the body via hinges (not shown), such hinges providing for the pivotal opening and closing of the lid. Lid 16 is thus selectively operable to open and close access to cavity 14. Preferably, where hazardous materials are to be held, within the container, body 12 and lid 16 come together to form a substantially hermetic seal, protecting the public from exposure to such materials. Those skilled in the art will recognize that such a seal may be provided by placement of a rubber-like O-ring (not shown) at the intersection between the lid and the body.

In the preferred embodiment, cavity 14 has a relatively large capacity, providing approximately 35 cubic feet of storage space. The container is reusable being composed of a fiberglass material having fire-retardant properties in order to ensure the safe temporary storage and transportation of infectious waste.

Figures 3, 4:
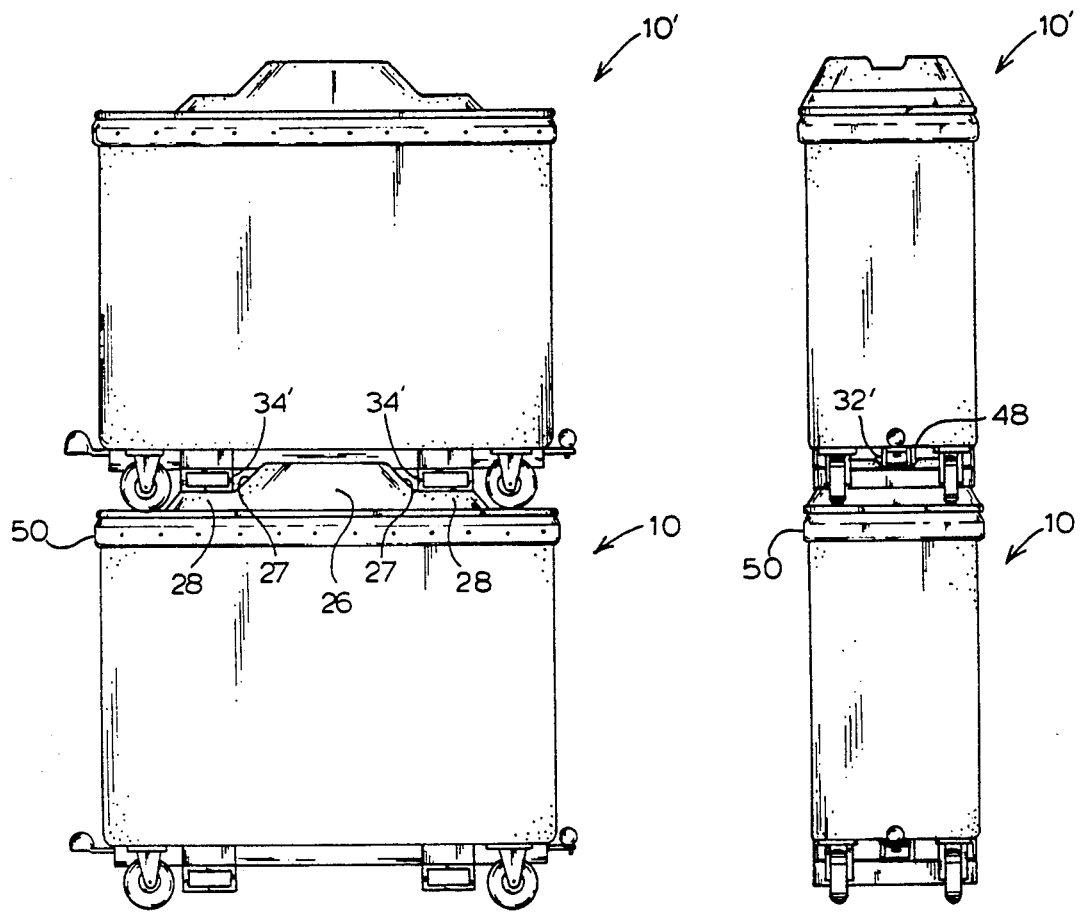
FIG. 3 is a side view of plural containers of the type depicted in FIG. 1 the containers being arranged in an aligned vertical stack.
FIG. 4 is an end view of the container stack depicted in FIG. 3.

Referring specifically to FIG. 1, it will be noted that lid 16 includes what is referred to as a first exterior surface portion 22. In the preferred embodiment, surface portion 22 is the upper surface of the container lid. As shown, the surface portion includes a target region 24 which projects outwardly therefrom. The target region, in turn, includes a trapezoidal subregion 26 and a pair of pedestal subregions 28. Trapezoidal subregion 26 has a pair of oppositely facing, converging, inclined glide surfaces 27 (only one of which is visible in FIG. 1, but both of which are shown in FIG. 3). As will be further explained below, target region 24 is suited for use in urging the next-above-stacked container into vertical alignment with container 10.

Turning now to FIG. 2, it will be noted that body 12 includes a bottom surface 20, such surface being referred to as a second exterior surface portion. As shown, the second exterior surface portion has a structure 30 secured thereto. Structure 30 serves as an alignment region, the structure being adapted for cooperative interfitment with a target region of the next-below container. Structure 30 is made up of an elongate first member 32 and a pair of elongate second members 34, the second members extending transversely to first member 32.

Member 32 extends along floor 20, spanning the length of container 10. A channel 36 is defined in member 32, such channel being adapted for slidable receipt of connectors such as a male connector 38 and a matable female connector 40. Using such connectors, containers may be arranged in container trains such that they may be towed end-to-end behind a transport vehicle. Such trains may, in fact, be arranged using container stacks, providing for improved mobility for container groups.

As shown, each of the transversely disposed second members 34 defines a passageway as shown at 42. In the preferred embodiment, members 34 are parallelly spaced, extending orthoganally to member 32 to act as fork-lift compatible receivers so that the container may be lifted into a stacked position or into a vehicle for transportation. To insure stability, members 34 are secured to body 12 by spacer elements such as at 44.

Wheel assemblies 46 are secured to surface 20, providing for improved mobility of the containers.

Turning now to FIGS. 3 and 4, it will be noted that containers of the type depicted in FIGS. 1 and 2 may be stacked by simple vertical positioning of a second container above a first container. The alignment structure of a like second container 10' engages the target region of first container 10 to provide for aligned vertical stacking of the containers. As is best shown in FIG. 3, pedestal subregions 28 are dimensioned fore and aft of trapezoidal subregion 26 such that the bottom surfaces of fork-lift receivers 34' on the next-above-stacked container engage the upper surface of the pedestal subregions of the first container.

The target region provides, upon placement of container 10' above container 10 within a predetermined range of relative fore and aft positions, for the urging of the containers into vertical alignment with respect to the length of the containers (left to right in FIG. 3). Such urging is accomplished via translational engagement of either of the two fork-lift receivers 34' with a corresponding glide surface 27. Upon such engagement, the fork-lift receiver glides along the glide surface under the weight of the above-stacked container toward seating on pedestal subregion 28. It is important to note that glide surface 27 is inclined, the longitudinal extent of such incline (along the length of the container) defining the predetermined range in which placement of vertically adjacent containers will be self-guided into proper vertical alignment.

Referring for a moment to FIG. 4, it will be noted that member 32' is, upon vertical stacking of containers 10 and 10', seated within a channel or groove 48 formed in trapezoidal subregion 26. Groove 48 is defined in part by a pair of facing counter-inclined groove surfaces. Due to the incline of the surfaces defining groove 48, aligned vertical stacking of container 10' atop container 10 may be accomplished with respect to the width of the containers (left to right in FIG. 4). Such alignment is achieved where container 10' has been placed above container 10 within the limits of a predetermined transverse range. Placement of second container 10' atop first container 10 such that member 32' engages either of the two counter-inclined surfaces of groove 48 will therefore result in a sliding movement of member 32' along such surface into aligned seating within groove 48 of first container 10.

Container 10' is therefore placed in substantially non-offset vertical alignment with respect to container 10 therebelow.

Any tendency of the upper container to shift from side-to-side (left or right in FIG. 4) is opposed by engagement of member 32' with either side of groove 48. Similarly, fork-lift receivers 34' of the container 10' capture the lower container's trapezoidal subregion 26 therebetween, opposing any tendency of the upper container to shift fore or aft (left or right in FIG. 3). By virtue of opposition to relative movement in orthogonal directions, all relative transverse movement of the containers is opposed.

Where, as in the preferred embodiment, the containers are wheeled, the wheels of the stacked container are dimensioned, relative to the various upward extents of target region 24 and the various downward extents of members 32', 34' to rest on the lid of the next-below container, further opposing relative movement of the containers.

Those skilled in the art will recognize that the vertically extending surfaces on lid 16 provide truss-like support for the above-stacked containers which may weigh hundreds of pounds. It should also be noted that the stacked container engages the lower container in a way that encourages relatively lid-extensive weight distribution, improving stability of container stacks.

Figure 5:
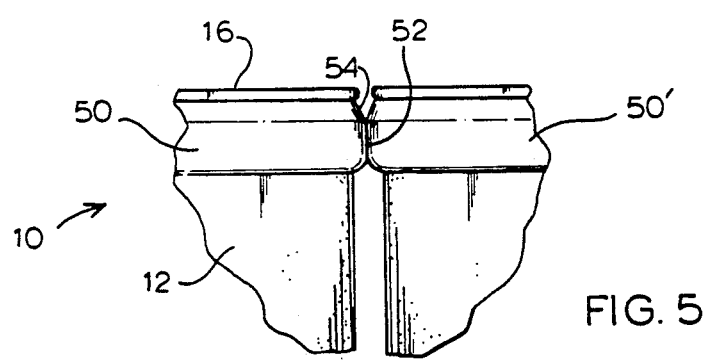
FIG. 5 is an enlarged, fragmentary side view of laterally adjacent containers of the type depicted in FIG. 1 illustrating contact between bumpers of such containers.

With reference to FIGS. 1-4 inclusive, it will be noted that the container of the presently described embodiment includes a bumper 50 extending around an upper perimeter near lid 16. As best shown in FIG. 5, bumper 50 extends outwardly from body 12, providing an abutment region to contact other objects such as walls or other containers. Bumper 50 includes a substantially vertical contact surface 52 adapted for contacting an adjacent container's bumper 50'. The upper-most portion of the bumper is inclined slide surface as shown at 54, the bumper having a generally wedge-shaped cross-section. As shown, the bumper has a height which is at least twice the bumper's thickness, thereby providing a substantial, vertical extent along which an adjacent container's bumper may make momentary contact, but will tend advantageously to slide down rather than to remain "hiked up".

Such a bumper is particularly useful where, as is commonly the practice, containers are arranged in close proximity to one another. Under such conditions, bumpers of alternative construction may result in one bumper "hiking up" on another bumper. Where bumpers are designed in accordance with those shown in FIG. 5, a higher bumper is more likely (especially under the substantial weight of a container loaded to capacity) to slide down the inclined surface of an adjacent, lower bumper, leaving both containers resting on their respective support surfaces or bases, as indicated in FIG. 5.

The invention thus provides a unique stackable container, such container being adapted for cooperative self-seating, self-aligning engagement with a vertically adjacent like container.

Accordingly, while a preferred embodiment of the invention has been disclosed, it should be appreciated that variations and modifications may be made without departing from the scope of the invention as defined by the claims.

What is claimed and desired to secure by letters patent:

1. A stackable container comprising:
    a first exterior surface portion including a projecting target region, said target region having a pair of generally oppositely-facing glide surfaces and a recess formed therein; and
    a second exterior surface portion including a projecting alignment region, said alignment region having a first elongate member and a pair of spaced second elongate members, said first member extending transversely to said second members, said alignment region being adapted for cooperative interfitment with the target region of a similar, vertically-adjacent container, said first member being adapted for placement within the recess of the similar container's target region and each of said second members being positionable adjacent an oppositely-facing glide surface of the similar target region, transverse movement of said container relative to the similar container thus being opposed.

2. The container of claim 1, wherein each of said second members is adapted for translational engagement with the corresponding glide surface of a similar, vertically-adjacent container, translational engagement between said second members and the glide surfaces of the similar container tending to urge the containers into vertical alignment.

3. The container of claim 1, wherein said target region has a trapezoidal cross section, said oppositely-facing glide surfaces being inclined.

4. A self-aligning, stackable container comprising:
    a body including a plurality of walls and a floor joining the define a cavity therein;
    a lid adapted for operative association with said body, said lid including a projecting target region having a pair of converging, oppositely-facing glide surfaces, said target region defining at least one elongate groove having a pair of facing, counter-inclined groove surfaces; and
    an alignment structure operatively associated with said floor and extending outwardly therefrom, said alignment structure including an elongate first member and at least one elongate second member extending transversely relative to said first member, said alignment structure being adapted for self-aligning, cooperative interfitment with a target region of a vertically adjacent container to oppose relative transverse movement of the containers.

5. The container of claim 4 wherein said alignment structure includes a pair of said second members, each defining a passageway adapted for receipt of a fork-lift arm.

6. The container of claim 4 wherein said first member includes first and second ends, said first end having a male connector operatively associated therewith and said second end having a mating female connector operatively associated therewith, said container thus being adapted for mating association with similarly-equipped containers.

7. The container of claim 6 wherein said first member defines a channel, said channel being adapted for slidable association with said connectors.

8. The container of claim 4 wherein said body and said lid are operable to seal said cavity.

9. A self-aligning, stackable container comprising:
    a body including a plurality of walls and a floor joining the define a cavity therein;
    a lid adapted for operative association with said body, said lid including a projecting target region having a pair of converging, oppositely-facing glide surfaces, said target region defining at least one elongate groove having a pair of facing, counter-inclined groove surfaces; and
    an alignment structure operatively associated with said floor and extending outwardly therefrom, said alignment structure including an elongate first member and at least one elongate second member transversely positioned relative to said first member, said alignment structure being adapted for self-aligning, cooperative interfitment with such a target region of a vertically adjacent container to oppose relative transverse movement of the containers; and
    a plurality of wheels operatively secured to said floor, said wheels being adapted to rest on the lid of a like, vertically aligned adjacent container.

* * * * *

UNITED STATES PATENT AND TRADEMARK OFFICE
CERTIFICATE OF CORRECTION

PATENT NO.  : 5,186,330

DATED       : February 16, 1993

INVENTOR(S) : Delmar H. McClure

It is certified that error appears in the above-identified patent and that said Letters Patent is hereby corrected as shown below:

In column 6, line 3, delete "the" and insert --to--; line 37, delete "the" and insert --to--.

Signed and Sealed this

Twenty-third Day of November, 1993

Attest:

BRUCE LEHMAN

*Attesting Officer*     *Commissioner of Patents and Trademarks*